United States Patent
Kim et al.

(10) Patent No.: US 9,344,859 B2
(45) Date of Patent: May 17, 2016

(54) METHOD OF RECEIVING MULTICAST DATA IN A WIRELESS COMMUNICATION SYSTEM, AND DEVICE FOR SAME

(75) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 14/131,659

(22) PCT Filed: Jul. 10, 2012

(86) PCT No.: PCT/KR2012/005456
§ 371 (c)(1),
(2), (4) Date: Jan. 8, 2014

(87) PCT Pub. No.: WO2013/009069
PCT Pub. Date: Jan. 17, 2013

(65) Prior Publication Data
US 2014/0140261 A1   May 22, 2014

Related U.S. Application Data

(60) Provisional application No. 61/506,156, filed on Jul. 10, 2011, provisional application No. 61/507,614, filed on Jul. 14, 2011.

(51) Int. Cl.
| | |
|---|---|
| *H04W 4/00* | (2009.01) |
| *H04W 4/06* | (2009.01) |
| *H04W 76/00* | (2009.01) |
| *H04L 12/18* | (2006.01) |
| *H04W 68/00* | (2009.01) |

(52) U.S. Cl.
CPC ............... *H04W 4/06* (2013.01); *H04L 12/189* (2013.01); *H04W 4/005* (2013.01); *H04W 76/002* (2013.01); *H04W 68/00* (2013.01)

(58) Field of Classification Search
USPC .......................... 370/329, 330, 331, 333, 338
See application file for complete search history.

(56) References Cited

U.S. PATENT DOCUMENTS

| | | | |
|---|---|---|---|
| 2010/0167756 A1* | 7/2010 | Park ..................... | H04W 64/00 455/456.1 |
| 2011/0128911 A1 | 6/2011 | Shaheen | |
| 2011/0134841 A1* | 6/2011 | Shaheen ................. | H04W 4/00 370/328 |
| 2012/0030358 A1* | 2/2012 | MacKenzie ....... | H04W 52/0216 709/226 |

(Continued)

OTHER PUBLICATIONS

Samsung Electronics, "M2M Multicast Operation in idle mode," IEEE 802.16 Broadband Wireless Access Working Group, IEEE C80216p-11/0057r1, May 2011, 4 pages.

(Continued)

*Primary Examiner* — Zewdu A Beyen
(74) *Attorney, Agent, or Firm* — Lee, Hong, Degerman, Kang & Waimey; Jonathan Kang; Harry Lee

(57) ABSTRACT

The present invention relates to a method of receiving multicast data in a wireless communication system for supporting Machine to Machine Communication, and a device for same. In more detail, the method includes: receiving a paging message including information on the timing at which the transmission of multicast data from a base station is completed in a paging listening interval; receiving the multicast data from the base station; and entering an unavailable interval when the timing is reached, at which the transmission of the multicast data is completed.

12 Claims, 7 Drawing Sheets

(56) References Cited

U.S. PATENT DOCUMENTS

2012/0202543 A1* 8/2012 Murias ............... H04W 4/005
 455/509
2012/0276945 A1* 11/2012 Chindapol ............ H04W 48/20
 455/525

OTHER PUBLICATIONS

LG Electronics, "Reply contribution on DEV RG output, C80216p-11/0001 (M2M multicast operation in idle mode)," IEEE 802.16 Broadband Wireless Access Working Group, IEEE 802.16p-11/0047r1, Mar. 2011, 4 pages.

LG Electronics, "[DEV] DL multicast transmission for M2M devices," IEEE 802.16 Broadband Wireless Access Working Group, IEEE 802.16p-rg-11/0021, Feb. 2011, 4 pages.

PCT International Application No. PCT/KR2012/005456, Written Opinion of the International Searching Authority dated Jan. 21, 2013, 16 pages.

\* cited by examiner

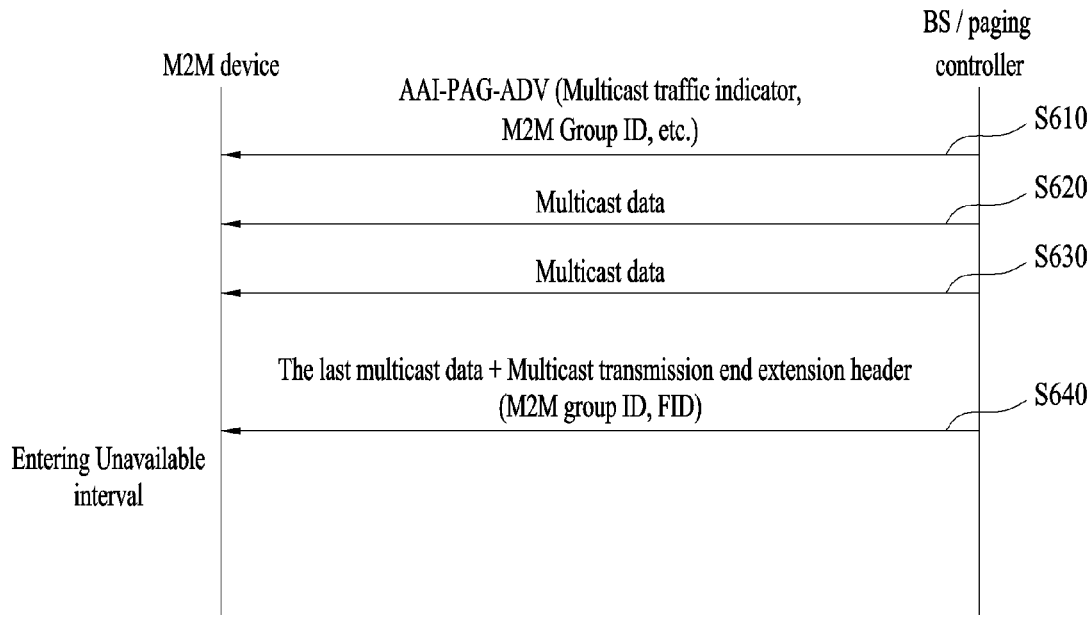
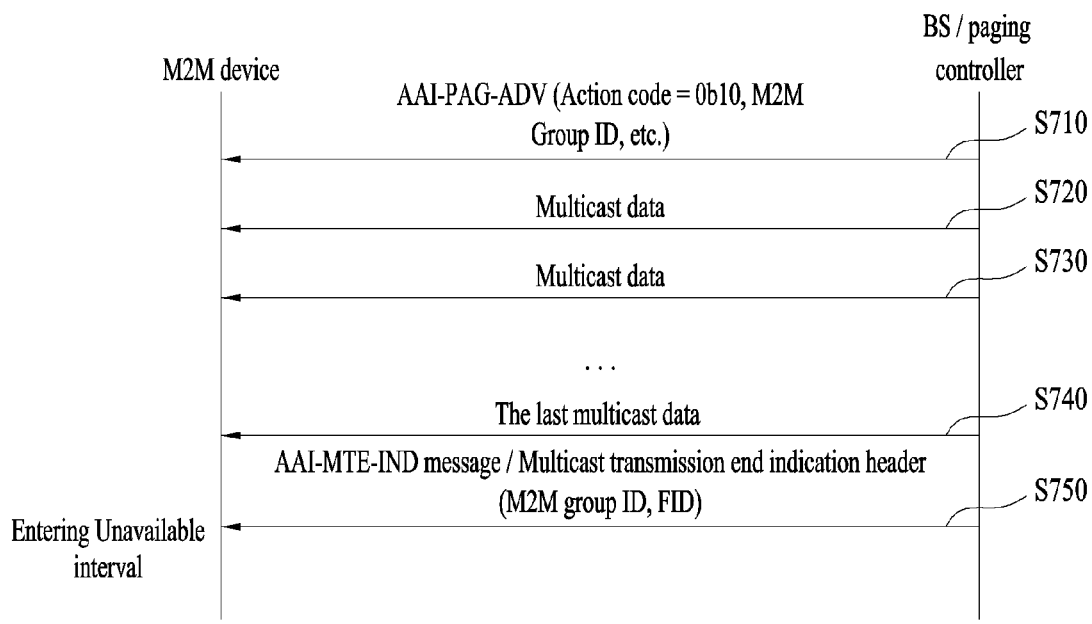

METHOD OF RECEIVING MULTICAST DATA IN A WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2012/005456, filed on Jul. 10, 2012, which claims the benefit of U.S. Provisional Application Ser. No. 61/506,156, filed on Jul. 10, 2011, and 61/507,614, filed on Jul. 14, 2011, the contents of which are all hereby incorporated by reference herein in their entirety.

TECHNICAL FIELD

The present invention relates to a wireless communication system, and more particularly, to a method of receiving multicast data in a wireless communication system supportive of M2M (machine to machine) communication and apparatus for supporting the same.

BACKGROUND ART

Generally, a machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication performed without human involvement.

In the early 1990's, in which the concept of the M2M communication has been initially introduced, the M2M communication has been recognized as remote control or telematics or the like and derivative markets of the M2M communication were very limitative. Yet, the M2M communication has grown rapidly for past few years and has become the globally noteworthy markets. Specifically, in POS (point of sales) and security related application markets, the M2M communication has considerably influence on such field as fleet management, remote monitoring of machinery and equipment, smart meter for auto-measurement of operating time, consumed heat or electricity quantity on construction machinery equipment and the like. M2M communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the M2M communication environment, every machine equipped with SIM (subscriber identity module) card enables data transmission and reception and is capable of remote management and control. For instance, as M2M communication technology is usable for numerous devices and equipment including vehicles, trucks, containers, auto-vending machines, gas tanks and the like, its application fields may reach far and wide.

DISCLOSURE OF THE INVENTION

Technical Tasks

One technical task of the present invention is to provide a method for smoothly transceiving multicast data in a wireless communication system, and more particularly, in an M2M communication supportive wireless communication system and apparatus for the same.

Another technical task of the present invention is to provide a method of preventing power consumption of a device supportive of M2M communication and apparatus for the same.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving multicast data, which is received in a wireless communication system supportive of M2M (machine to machine) communication according to one embodiment of the present invention includes the steps of receiving a paging message including an information on a timing point of ending a transmission of the multicast data from a base station in a paging listening interval, receiving the multicast data from the base station, and entering an unavailable interval if the timing point of ending the transmission of the multicast data comes.

To further achieve these and other advantages and in accordance with the purpose of the present invention, as embodied and broadly described, an apparatus for receiving multicast data in a wireless communication system supportive of M2M (machine to machine) communication according to another embodiment of the present invention includes an RF (radio frequency) unit configured to transceive a radio signal and a processor receiving a paging message including an information on a timing point of ending a transmission of the multicast data from a base station in a paging listening interval, the processor receiving the multicast data from the base station, the processor entering an unavailable interval if the timing point of ending the transmission of the multicast data comes.

Preferably, the paging message includes a multicast transmission end time (MTET) field and the information on the timing point of ending the transmission of the multicast data comprises a frame number for ending the transmission of the multicast data indicated by the MTET field.

Preferably, the paging message includes a duration field and the information on the timing point of ending the transmission of the multicast data comprises an interval ranging from a timing point of receiving the paging message indicated by the duration field to the timing point of ending the transmission of the multicast data.

Preferably, if the paging message includes a multicast transmission start time (MTST) field, the duration filed indicates an interval ranging from a timing point indicated by the MTST field to the timing point of ending the transmission of the multicast data.

Preferably, the paging message includes a timer field and the information on the timing point of ending the transmission of the multicast data includes an interval ranging from a timing point of a last reception of the multicast data indicated by the timer field to the timing point of ending the transmission of the multicast data.

Preferably, the paging message further includes a multicast receiving mode field. If the multicast receiving mode field is set to a predetermined value, the paging message includes the information on the multicast transmission end time.

Preferably, the paging message includes an AAI-PAG-ADV message,

Advantageous Effects

According to an embodiment of the present invention, multicast data can be smoothly transceived in a wireless communication system, and more preferably, in an M2M (machine to machine) communication supportive wireless communication system.

According to an embodiment of the present invention, when a base station transmits multicast data, information on a timing point of ending a transmission of the multicast data is transmitted, whereby power consumption of a device supportive of an M2M communication can be prevented.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 6 to 11 are diagrams for other examples of a multicast data transmission between an M2M device and a base station according to one embodiment of the present invention.

BEST MODE FOR INVENTION

Figure 1:
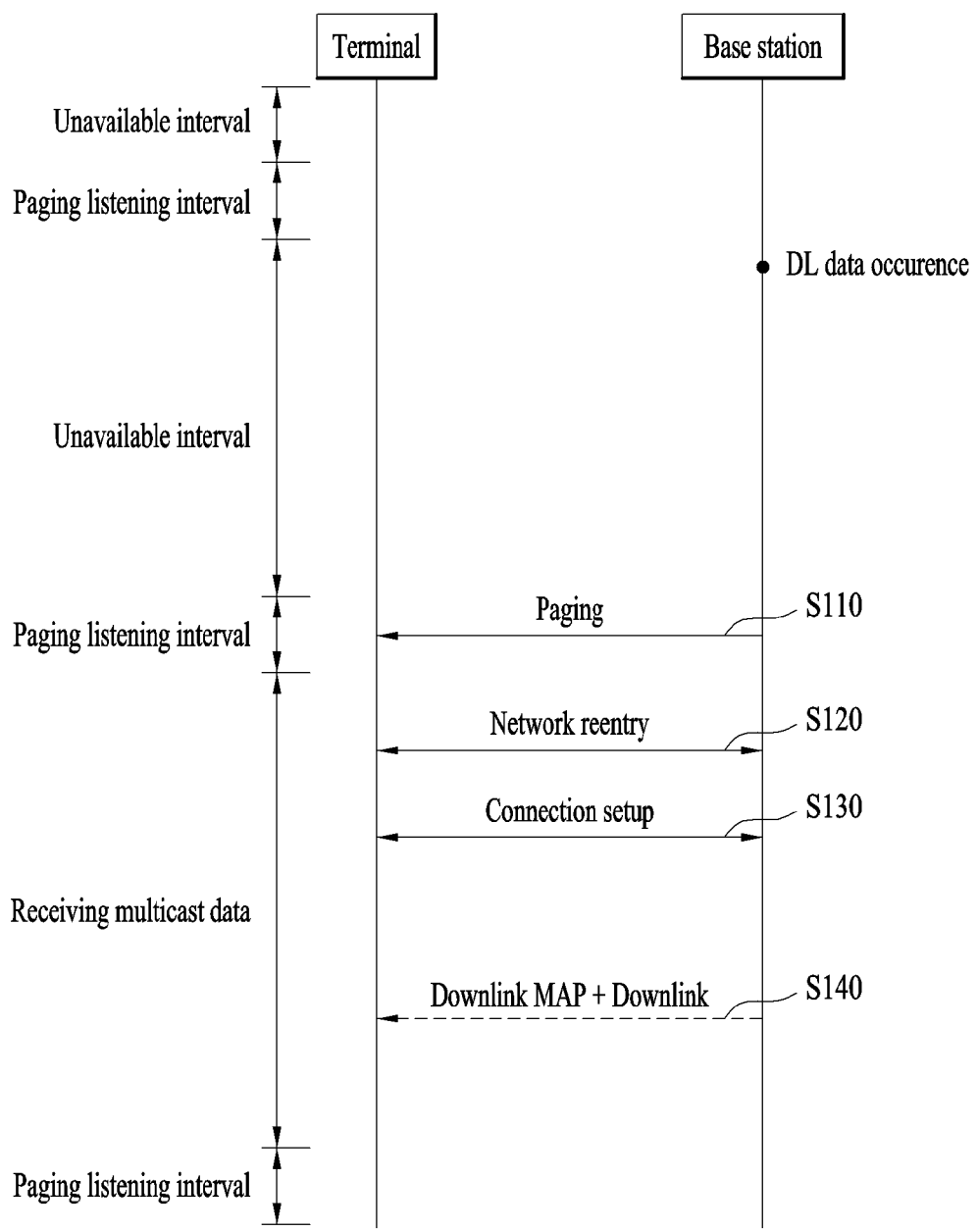
FIG. 1 is a flowchart of a paging procedure in idle mode.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), a station (STA) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

In the following description, an M2M communication may mean a type of communication performed between mobile stations or between a base station and each of mobile stations without human involvement. And, the M2M communication can be used interchangeably with such a terminology as D2D (device to device) communication, P2P (peer to peer) communication and the like. Moreover, an M2M device may mean a mobile station capable of supporting the above-mentioned M2M device communication. An access service network for an M2M service may be defined as an M2M ASN (M2M access service network) and a network entity performing communications with M2M devices may be named an M2M server. In particular, the M2M server activates an M2M application and provides an M2M-specific service for at least one or more M2M devices. An M2M feature indicates a feature of an M2M application. And, at least one feature may be necessary to provide an application. An M2M device group may mean a group of M2M devices that share at least one common feature with each other.

The devices performing communications by M2M scheme may be variously named M2M devices, M2M communication devices, MTC (machine type communication) devices and the like. And, the number of the devices will increase gradually as the number of machine application types does. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types.

According to another property of M2M device, the M2M device may have low mobility or no mobility. If a prescribed M2M device has considerably low mobility or does not have mobility at all, it may mean that the corresponding M2M device is stationary in the long term. An M2M communication system may be able to simplify or optimize mobility related operations for a specific M2M application related to such an M2M device having a stationary location as an M2M device for secured access and surveillance, an M2M device for public safety, an M2M device for payment, an M2M device for remote maintenance and control, an M2M device for metering and the like.

Thus, as the device application types increasingly diversified, the number of M2M communication devices may increase more greatly than that of general mobile communication devices. Hence, in case that all of the devices individually perform communications with a base station, it may put serious loads on a radio interface and a network.

In the following description, an embodiment of the present invention is explained with reference to a case of applying M2M communication to a wireless communication system (e.g., IEEE 802.16 system), by which the present invention may be non-limited. And, an embodiment of the present invention is applicable to such a different wireless communication system as 3GPP LTE system and the like in the same manner.

1. Idle Mode

Although a mobile station roams a radio link environment in which a plurality of base station exists across a wide area, an idle mode or an idle state means the mechanism for receiving a downlink broadcast message periodically without registering at a specific base station. In particular, if a mobile station does not receive traffic from a base station for a prescribed time, it is able to enter an idle mode for power saving.

An idle mode can give a benefit to a mobile station by removing an activation request related to a handover and general operation requests. The idle mode puts restriction in a manner that mobile station activity is scanned in a discrete period, whereby a power and operating resources used by the mobile station can be saved. The idle mode provides a simple and appropriate scheme for informing a mobile station of a downlink traffic in pending and removes a radio interface and a network handover traffic from an inactive mobile station, thereby giving benefits to a network and a base station.

In the idle mode, all normal operations are stopped as well as a handover and downlink synchronization is coordinated to receive a paging message, which is a kind of a broadcast message, in a predetermined interval only. In this case, the paging message is the message that gives an instruction of a paging action to a mobile station. For instance, the paging operation may include one of a ranging operation, a network reentry and the like.

Paging means a function of obtaining a location (e.g., a prescribed base station, a prescribed switching station, etc.) of a corresponding mobile station in case of an occurrence of an incoming signal in a mobile communication. A multitude of base station supportive of an idle state or an idle mode can configure a paging region by belonging to a specific paging group. In this case, a paging group indicates a logical group. The object of the paging group is to provide an adjacent range region that can be paged in downlink. Preferably, the paging group is configured to meet a condition that the paging group is large enough for a specific mobile station to exist for most of time within the same paging group and a condition that the paging group is small enough for a paging load to maintain an appropriate level.

A paging group can include at least one base station. And, one base station can be included in one or more paging groups. The paging group is defined by a management system. A paging group-action backbone network message is usable in a paging group. Moreover, a paging controller can manage a list of mobile stations in an idle state using a paging-announce message corresponding to one of backbone network messages and is also able to manage an initial paging of every base station belonging to a paging group.

The idle mode can be initiated by a mobile station or a base station. In particular, the mobile station sends a deregistration request (DREG-REQ) message to a base station and then receives a deregistration response (DREG-RSP) message from the base station in response to the deregistration request message, thereby entering the idle mode. Moreover, if the base station sends a non-requested deregistration response (DREG-RSP) message or a deregistration command (DREG-CMD) message to the mobile station, the mobile station can enter the idle mode.

In case that a mobile station receives a paging message corresponding to itself for an available interval (AI), the mobile station switches to a connected mode through a network entry process with a base station and then transceives data.

FIG. 1 is a flowchart for one example of a paging procedure in idle mode.

Referring to FIG. 1, when a mobile station stays in idle mode, the mobile station sends a deregistration request (DREG-REQ) message for requesting a deregistration with a base station to the base station in order to enter an idle mode. Subsequently, the base station sends a deregistration response (DREG-RSP) message to the mobile station in response to the DREG-REQ message. In this case, the DREG-RSP message contains a paging information. In doing so, the entry of the mobile station into the idle mode may be initiated by a request made by the base station. In this case, the base station sends a DREG-RSP message to the mobile station.

In this case, the above-mentioned DREG-RSP message includes paging information. In particular, the paging information may include a paging cycle, a paging offset, a paging group identifier (PGID), a paging listening interval value and the like.

Having received the DREG-RSP message from the base station, the mobile station enters the idle mode with reference to the paging information. The idle mode has a paging cycle and one paging cycle can be configured with an available interval and an unavailable interval. In this case, the available interval has the same concept of a paging listening interval or a paging interval. A paging offset indicates a start point (e.g., a frame, a subframe, etc.) from which a paging interval starts within a paging cycle. A paging group identifier indicates an identifier of a paging group assigned to a mobile station. Moreover, the paging information may include a paging message offset information. In this case, the paging message offset information indicates a timing point at which a paging message is sent from a base station. Subsequently, the mobile station can receive a paging message delivered to itself in the available interval or the paging listening interval) using the paging information. In this case, the paging message may be sent via the base station or a paging controller. In particular, in order to receive a paging message, the mobile station monitors a radio channel in accordance with the paging cycle.

The mobile station in the idle mode receives a paging message in a paging listening interval of its own and then checks whether there is a downlink (DL) data delivered to itself [S110]. If there is the DL data (i.e., positive indication), the mobile station performs a network reentry process including a ranging process [S120]. Subsequently, through a DSA (dynamic service addition) process, the mobile station performs a process for establishing a connection to a related DL service flow [S130]. After the connection to the service flow has been established, the base station transmits DL data for the corresponding service to the mobile station [S140].

2. Multicast Data Transmitting Method

In M2M communication (or MTC), an automatic application or firmware update process for M2M devices (or MTC devices) may become an important application in M2M service scenarios. For instance, in order update firmware of each device, a network (e.g., an M2M server, a base station, etc.) may be able to transmit updated information to every M2M device having the corresponding application.

Yet, in order for the network to transmit the updated information to each M2M device in idle mode by unicast or multicast, a base station pages the corresponding M2M devices. Subsequently, each of the paged mobile stations should perform a network reentry process in a manner of initiating a transmission of random access code. Hence, congestion may occur in a radio channel. Moreover, in case that the network delivers the updated information to the M2M devices by unicast, a delay of data reception increases and resource waste may occur.

In order to solve these problems, when an M2M device in idle mode receives multicast data generated by event triggering, it is able to receive multicast traffic using a paging method, i.e., without a network reentry process (or an idle mode termination).

Figure 2:
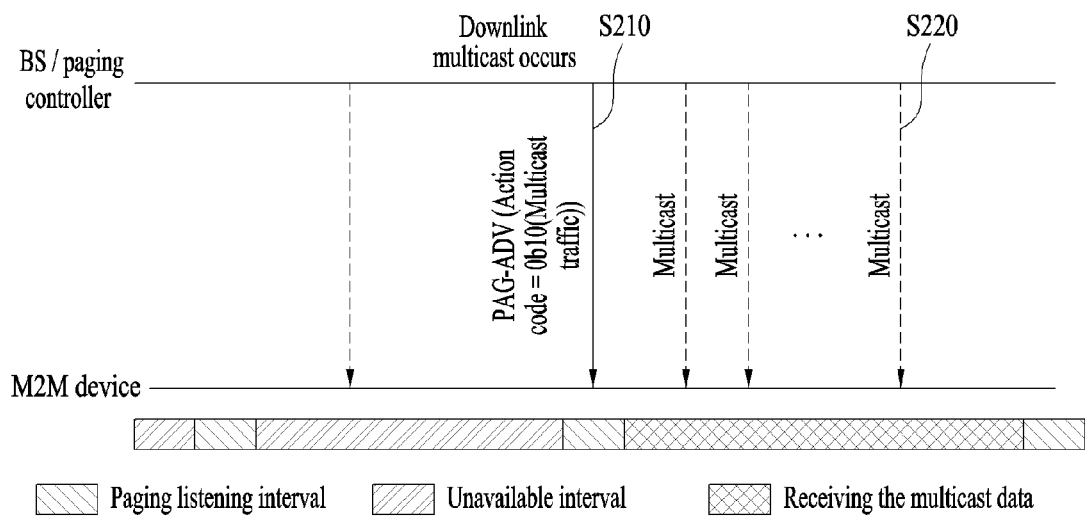
FIG. 2 and FIG. 3 are diagrams for examples of multicast data transmission transceiving between an M2M device and a base station.

FIG. 2 is a diagram for one example of a multicast data transmission/reception between an M2M device and a base station.

Referring to FIG. 2, before transmitting M2M multicast data to an M2M device, a base station sends a paging message including a multicast traffic indication (i.e., indicating that multicast data is transmitted) in a paging listening interval of M2M devices [2310]. In this case, an action code of the paging message indicates a multicast traffic indication (e.g., 0b10) and a corresponding M2M group identifier (MGID) is included. When the paging message is received, the M2M device checks whether M2M group ID previously assigned to the corresponding M2M device is included in a group paging part of the paging message. If the MGID assigned to the M2M device is included and a corresponding action code is 0b10, the processor of the M2M device determines that a multicast traffic (data) will be transmitted for a group indicated by the MGID and can control the M2M device to wait for receiving the multicast traffic without ending an idle mode. In this case, the processor of the M2M device controls an operation (e.g., DL control channel and multicast data decoding) of receiving the multicast data to be performed in an unavailable interval as well.

In doing so, if the base station is unable to transmit multicast data right after sending the paging message, the base station can transmit an information on a multicast transmission start time (MTST) for the corresponding M2M group ID (MGID) in a manner that the corresponding information is included in the paging message.

When each of the M2M devices receives the paging message (e.g., AAI-PAG-ADV (advanced air interface-paging-advertisement) message) in its paging listening interval, the processor of the corresponding M2M device checks whether the multicast traffic indication (action code=ob10) and the M2M group ID (MGID) assigned to the corresponding M2M device exist. If the multicast traffic indication indicating that the multicast traffic will be transmitted is included, the processor of the M2M device checks whether the multicast transmission start time information is included in the paging message. If the multicast transmission start time information is included in the paging message, the processor of the M2M device can control a power-down operation to be performed to reduce power consumption until a frame indicated by the multicast transmission start time. In particular, the processor of the M2M device controls an operation of receiving the multicast data to be performed from the frame indicated by the MTST. The M2M device receives the multicast data in the frame indicated by the MTST [S220].

Table 1 shows one example of the paging message (e.g., AA_-PAG-ADV message) format.

TABLE 1

| Fields | Size | Value | Condition |
| --- | --- | --- | --- |
| . . . | . . . | . . . | . . . |
| For (i=0; i<Num_MGID; i++) { | | Num_MGID indicates the number of MGIDs included in this paging message [0 . . . 63] | |
| MGID | 12 | M2M Group ID | |
| Action Code | 2 | 0b00: Performing network reentry<br>0b01: Performing location update<br>0b10: Receiving multicast traffic<br>0b11: reserved | |
| If (Action code == 0b10) {<br>Multicast transmission start time (MTST) | 8 | Least Significant 8 bits of the frame number in which the ABS starts ending DL multicast data. | Shall be present when the MTST needs to be included in this message |
| } | | | |
| . . . | . . . | . . . | . . . |
| } | | | |
| . . . | . . . | . . . | . . . |

Referring to Table 1, a paging message includes an action code indicating a network reentry, a location update, a multicast or traffic reception or the like. If the action code set to 0b10 indicates the multicast traffic reception, the paging message can include a multicast transmission start time (MTST) field corresponding to an information on a multicast transmission start time. In particular, the multicast transmission start time is the information on a time (frame, subframe or superframe unit) at which a base station starts a multicast transmission to an M2M device. For example, the MTST may indicate least significant bits (LSB) of the frame number of a frame in which 8-bit DL multicast data starts to be transmitted.

Figure 3:
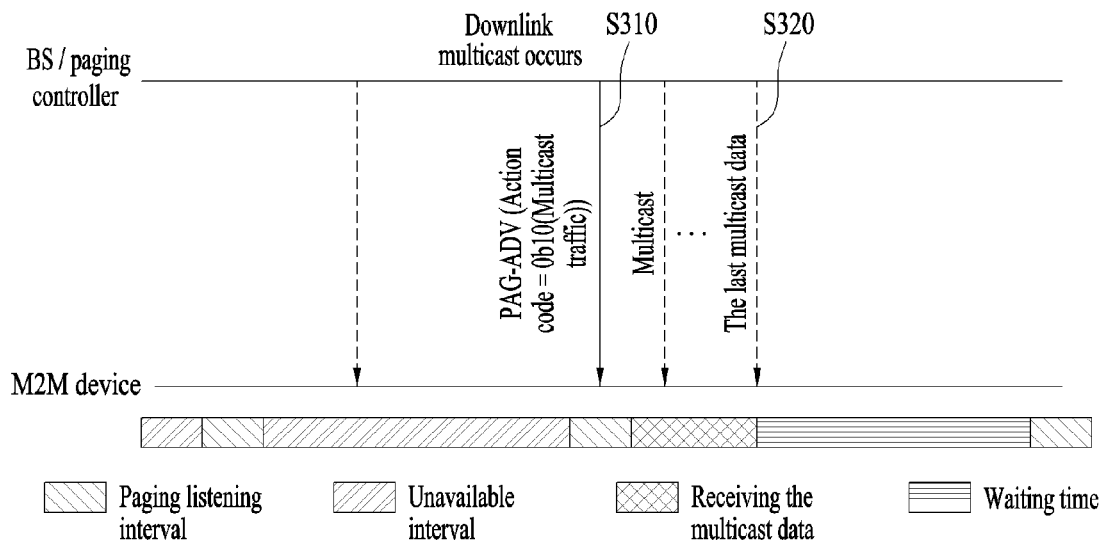

FIG. 3 is a diagram for one example of multicast data transmission and reception between an M2M device and a base station.

Referring to FIG. 3, as mentioned in the foregoing description with reference to FIG. 2, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S310]. In this case, if the received M2M group ID information indicates a group to which the corresponding M2M device belongs, the M2M device receives the multicast traffic without a network reentry [S320].

Yet, in this scenario, since the M2M device does not know when the multicast data will stop being transmitted from the base station, the M2M device may need to perform an operation of receiving the multicast data until a next paging listening interval. In particular, the M2M device performs the operation of receiving the multicast data as long as the waiting time in FIG. 3. Yet, in case that the multicast data includes such a small-size data as a firmware update, a time taken for the base station to actually transmit the multicast data is not considerable, which just causes a problem of increasing power consumption of the idle-mode M2M device. Particularly, right after paging, when the base station transmits small multicast data, the M2M device waits until a next paging listening interval, whereby a power consumption of the M2M device in idle mode is increased.

Owing to the M2M application properties, a long paging cycle may apply to a specific M2M device. In this case, an increasing rate of power consumption of the M2M device may further increase. For instance, considering that a paging cycle of an existing system (e.g., IEEE 802.16m system) amounts to maximum 512 super frames, a maximum value of a paging cycle in a system for M2M device (e.g., IEEE 802.16p system) can be defined as 4,194,304 super frames.

In the following description, as mentioned in the foregoing description, a method of solving the above-mentioned problem of the unnecessary power consumption of the idle-mode M2M device due to the scheduling information delivery by the base station is proposed.

2. 1. MTE (Multicast Transmission End) Information Transmission

Figure 4:
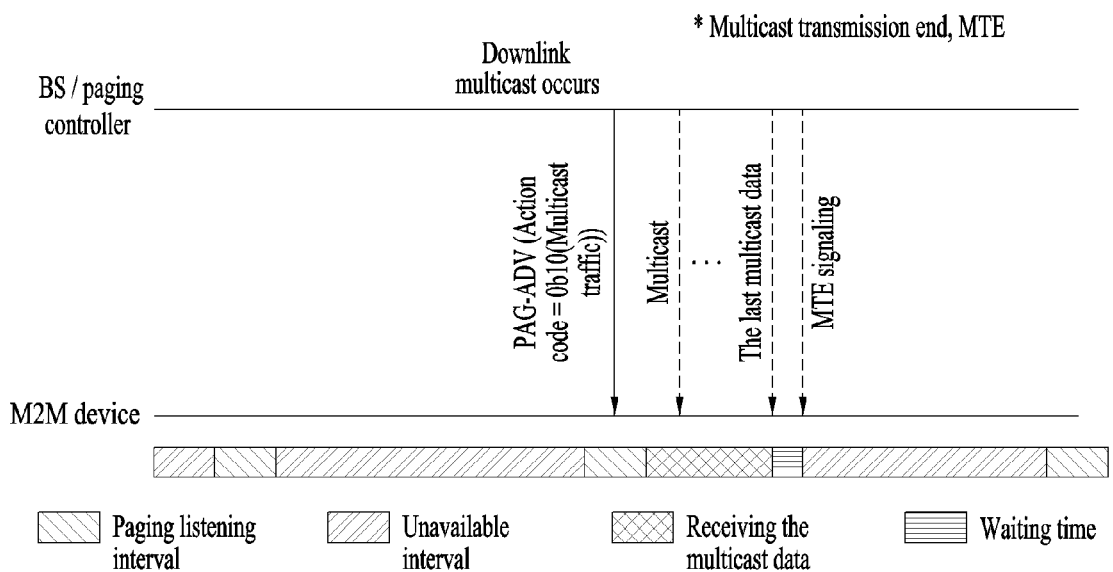
FIG. 4 and FIG. 5 are diagrams for one example of a multicast data transmission between an M2M device and a base station according to one embodiment of the present invention.
Figure 5:
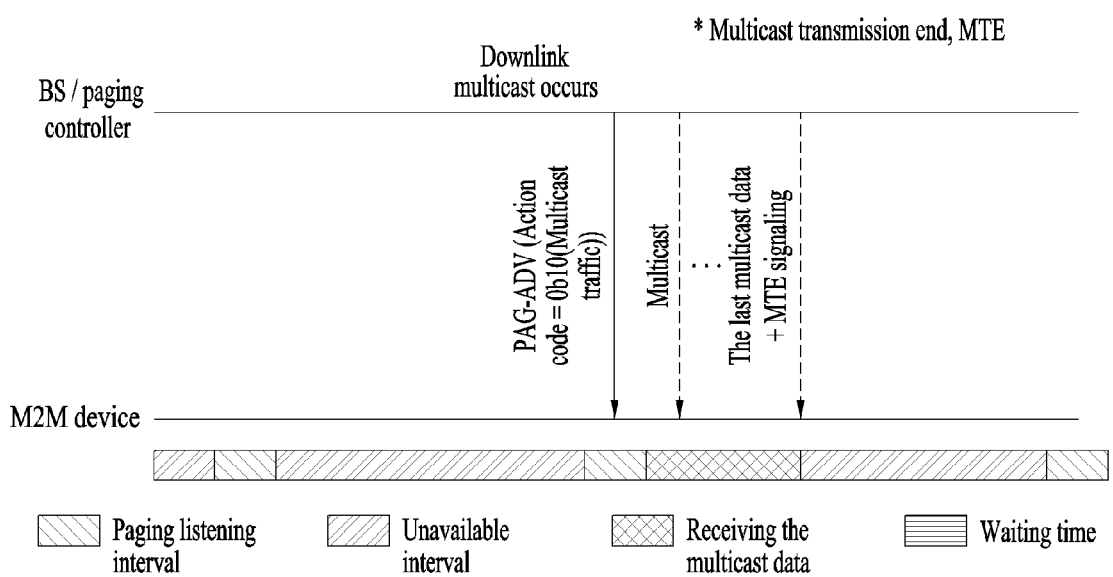

FIG. 4 and FIG. 5 are diagrams for examples of a multicast data transmission between an M2M device and a base station according to one embodiment of the present invention.

Referring to FIG. 4 and FIG. 5, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval). In this case, if the received M2M group ID information indicates a group to which the corresponding M2M device belongs, the M2M device waits for receiving the multicast traffic without reentering a network and is then able to receive the multicast traffic.

A base station can send a multicast transmission end (MTE) signaling on the following condition.

1) Condition 1: If a last data for a corresponding multicast group/multicast connection exists in a transmitting (Tx) buffer of a base station 2) Condition 2: When a base station receives a signal indicating that a data transmission for a corresponding multicast group/multicast connection has been ended from an entity of a network 3) Condition 3: After a base station has transmitted a data for a specific multicast group to an M2M device, if the base station fails in receiving data belonging to the same group from a network within a specific time (i.e., if a transmitting (Tx) buffer does not have the same multicast data for a specific time)

Referring to FIG. 4, when a base station determines that multicast data has been fully transmitted, the base station can separately transmit a signal (e.g., MTE (multicast transmission end) signal) indicating an end of the multicast data transmission to an M2M device. While an M2M device in idle mode is receiving multicast data, if the M2M device receives the signal indicating the end of the multicast data transmission from the base station, the M2M device directly enters a paging unavailable interval and is then able to perform an operation of reducing power consumption.

In case of Condition 1, referring to FIG. 5, a base station can transmit an MTE signal to an M2M device together with a last data at a timing point of transmitting the last data to its buffer. In case of Condition 2, if a base station receives a signal indicating a data transmission end while receiving multicast data from a network entity, the base station can transmit an MTE signal to an M2M device together when transmitting the corresponding multicast data. Thus, in case that a base station transmits an MTE signal together with a multicast data, the MTE signal can be transmitted by piggybacking on the multicast data or by being concatenated with the multicast data. When the MTE signal is transmitted by piggybacking, it can be transmitted in a sub-header format or an extended header format.

FIG. 6 is a diagram for another example of a multicast data transmission between an M2M device and a base station according to one embodiment of the present invention.

Referring to FIG. 6, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S610]. In this case, if the received M2M group ID information indicates a group to which the corresponding M2M device belongs, the M2M device waits for receiving the multicast traffic without reentering a network and is then able to receive the multicast traffic [S620, S630]. Subsequently, the base station can transmit both a last multicast data and a signal (e.g., an MTE (multicast transmission end) signal) indicating an end of a multicast data transmission to the M2M device [S640]. In this case, the MTE signal can be transmitted in a multicast transmission end extended header (MTEEH) format shown in Table 2. Table 2 shows one example of MTEEH format.

TABLE 2

| Syntax | Size (bits) | Description/Notes |
|---|---|---|
| Multicast Transmission End Indication Header ( ) { | | |
| Type | 4 | |
| M2M Group ID | TBD | M2M group ID to which devices belong |
| FID | 4 | ID for multicast connection |
| Idle resuming Start Frame | 4 | Least Significant 4 bits of the frame number in which the device resumes the idle mode by using the previous idle mode parameters |

Referring to Table 2, MTEEH format indicates that a multicast transmission has been ended through a type field. In order to indicate a type of a multicast information, the MTEEH format can include at least one of M2M group ID and FID for a related multicast connection. Moreover, the MTEEH format can include an idle mode resuming start frame information indicating when an M2M device can resume an idle mode after receiving MTEEH using previous idle mode parameters. In particular, if a frame indicated by an idle mode resuming start frame field corresponds to a paging unavailable interval of the M2M device when using a previous idle mode parameter, the M2M device enters the unavailable interval and is then able to perform an operation of reducing power consumption in order to reduce the power consumption. If the idle mode resuming start frame information is not included, the M2M device directly enters the unavailable interval. In doing so, the idle mode resuming start frame field can indicate least significant bits (e.g., 4 bits, etc.) of the frame number of the M2M device, which resumes the idle mode, using the previous idle mode parameters.

In IEEE 802.16e system, the MTEEH can be used in form of a subheader (i.e., MTE subheader) or an extended subheader (i.e., MTE extended subheader) and inclusive information may be similar. In this case, CID (connection identifier) may be included instead of FID.

FIG. 7 is a diagram for another example of a multicast data transmission between an M2M device and a base station according to one embodiment of the present invention.

Referring to FIG. 7, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S710]. In this case, if the received M2M group ID information indicates a group to which the corresponding M2M device belongs, the M2M device waits for receiving the multicast traffic without reentering a network and is then able to receive the multicast traffic [S720, S730]. Subsequently, the base station transmits a last multicast data to the M2M device [S740] and then informs the M2M device of a multicast data transmission end indication using such a MAC control message as AAI-MTE-IND message or a multicast transmission end indication header [S750]. In this case, the AAI-MTE-IND message or the multicast transmission end indication header can include an M2M group ID and an FID. If the M2M device receives an indicator indicating that the multicast data transmission has been ended, the M2M device enters an unavailable interval.

Thus, when the base station transmits the multicast transmission end (MTE) signal to the M2M device at the same timing point as Condition 3 mentioned in the foregoing description, the base station can transmit the multicast transmission end signal in form of a MAC control message or a signaling header. Table 3 shows one example of a format of AAI-MTE-IND message which is a sort of a MAC control message for delivering an MTE signal.

TABLE 3

| Fields | Size (bits) | Description/Notes |
| --- | --- | --- |
| M2M Group ID | TBD | M2M group ID to which devices belong |
| FID | 4 | ID for multicast connection |
| Idle resuming | 4 | Least Significant 4 bits of the frame |

TABLE 3-continued

| Fields | Size (bits) | Description/Notes |
| --- | --- | --- |
| Start Frame | | number in which the device resumes the idle mode by using the previous idle mode parameters |

Referring to Table 3, like Table 2, an M2M group ID field, an FID field, an idle mode resuming start frame field and the like can be included in an AAI-MTE-IND MAC control message format. If receiving an AAI-MTE-IND message, an M2M device can enter an idle mode in a frame indicated by the idle mode resuming start frame field.

In IEEE 802.16e system, the AAI-MTE-IND message can be used through a similar MAC control message and similar information can be included therein. In this case, CID (connection identifier) will be included instead of MGID or FID.

Table 4 shows one example of a format of MTEH format as a signaling header for delivering MTE signal.

TABLE 4

| Syntax | Size (bits) | Description/Notes |
| --- | --- | --- |
| Multicast Transmission End Indication Header ( ) { | | |
| FID | 4 | |
| Type | 5 | |
| Length | 3 | |
| M2M Group ID | 15 | M2M group ID to which devices belong |
| FID | 4 | ID for multicast connection |
| Idle resuming Start Frame | 4 | Least Significant 4 bits of the frame number in which the device resumes the idle mode by using the previous idle mode parameters |

Referring to Table 4, MTEH format can include an FID field, a type field indicating MTEH, a length field indicating a length, an M2M group ID field, an FID field indicating an FID corresponding to an ID for a multicast connection, and an idle mode resuming start field.

The AAI-MTE-IND message or the multicast transmission end indication header is applicable to 3GPP LTE system and 3GPP LTE-A system in a similar manner as well as to IEEE 802.16 system.

Figure 8:
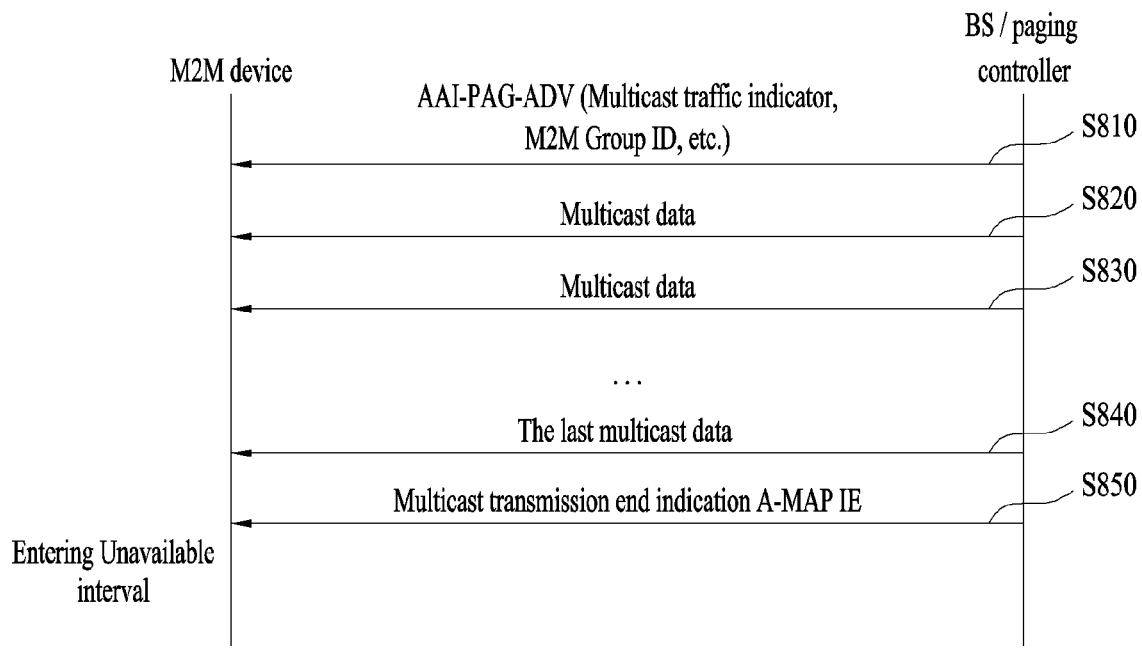

FIG. 8 is a diagram for another example of a multicast data transmission between an M2M device and a base station according to one embodiment of the present invention.

Referring to FIG. 8, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S810]. In this case, if the received M2M group ID information indicates a group to which the corresponding M2M device belongs, the M2M device waits for receiving the multicast traffic without reentering a network and is then able to receive the multicast traffic [S820, S830]. Subsequently, the base station transmits a last multicast data to the M2M device [S840] and may then transmit a multicast data transmission end indication signal (MTE signal) by physical layer signaling (PHY signaling) [S850]. The base station may transmit an MTE indicator to the M2M device in A-MAP IE format as a downlink control channel [S850]. If the M2M device receives an indicator indicating that the multicast data transmission has been ended, the M2M device enters an unavailable interval.

Table 5 shows one example of a multicast transmission end indication A-MAP IE format.

TABLE 5

| Syntax | Size (bits) | Description/Notes |
|---|---|---|
| Multicast Transmission End Indication A-MAP IE ( ) { | | |
| Type | 4 | |
| M2M Group ID | TBD | M2M group ID to which devices belong |
| FID | 4 | ID for multicast connection |
| Idle mode resuming Start Frame | 4 | Least Significant 4 bits of the frame number in which the device resumes the idle mode by using the previous idle mode parameters |

Referring to FIG. 5, a multicast transmission end indication A-MAP IE can include an M2M group ID field indicating an M2M group ID to which an M2M device belongs, an FID field indicating an ID for a multicast connection and an idle mode resuming start frame field. The multicast transmission end indication A-MAP IE may be transmitted in the same burst or frame of a last multicast data or at a timing point previous to that of the last multicast data. A start frame indicates a frame in which an M2M device enters an unavailable interval by stopping a multicast data reception.

Meanwhile, a base station can transmit an MTE indicator to an M2M device by physical layer signaling in a manner that the MTE indicator is included in a DL control channel (e.g., A-MAP IE format). For instance, the base station enables an indicator, which indicates that a corresponding data is a last data, to be included in MAP IE for allocating a DL resource of a last multicast data. If the corresponding data is the last data, the base station can set the corresponding bit to 1 for example. For example of the MAP IE, there may be broadcast assignment A-MAP IE.

A table in the following shows one example of broadcast assignment A-MAP IE for transmitting M2M multicast data and an indicator indicating a last multicast data is included.

Figure 9:
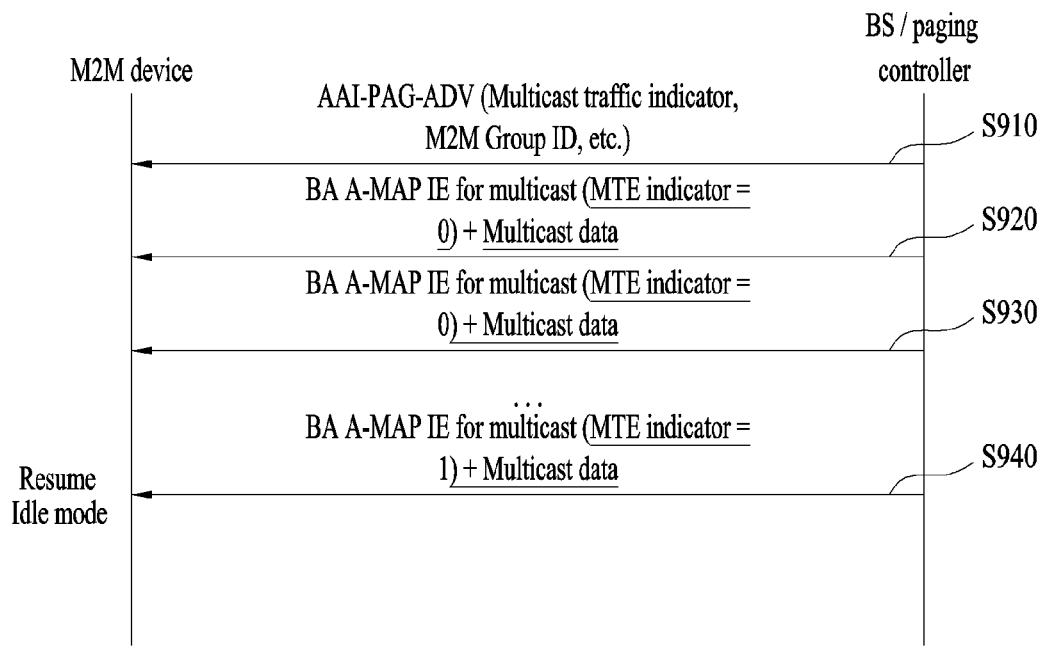

FIG. 9 is a diagram for a further example of a multicast data transmission between an M2M device and a base station according to one embodiment of the present invention.

Referring to FIG. 9, an M2M device in idle mode can receive a paging message including a multicast traffic indicator (e.g., action code=0b10) indicating a multicast traffic transmission and a group information (e.g., M2M group ID) for receiving a multicast traffic (or multicast data) from a base station in a listening interval (or an available interval) [S910]. In this case, if the received M2M group ID information indicates a group to which the corresponding M2M device belongs, the M2M device waits for receiving the multicast traffic without reentering a network and is then able to receive the multicast traffic and a broadcast assignment A-MAP IE (BA A-MAP IE) [S920]. In this case, an MTE indicator included in the broadcast assignment A-MAP IE is set to 0 to indicate that the multicast data keeps being transmitted. Subsequently, the base station transmits the multicast data and the broadcast assignment A-MAP IE (BA A-MAP IE) to the M2M device [S930]. In doing so, as the MTE indicator included in the broadcast assignment A-MAP IE is set to 0 to indicate that the multicast data keeps being transmitted.

While the multicast data transmissions are repeated, the base station transmits the multicast data and a broadcast assignment A-MAP IE (BA A-MAP IE) including an MTE indicator (in this case, the MTE indicator is set to 1) indicating a last multicast transmission to the M2M device [S940].

Having received the multicast data and the broadcast assignment A-MAP IE (BA A-MAP IE) including the MTE indicator indicating the last multicast transmission, the M2M device enters an idle mode again.

Table 6 shows one example of a broadcast assignment A-MAP IE.

TABLE 6

| Syntax | Size (bit) | Description/Notes |
|---|---|---|
| Broadcast_Assignment_A-MAP_IE( ) { | | |
| A-MAP IE Type | 4 | Broadcast Assignment A-MAP IE |
| Function Index | 2 | 0b00: This IE carries broadcast assignment information<br>0b01: This IE carries handover ranging channel allocation information<br>0b10: This IE carries multicast assignment information<br>0b11: This IE carries multicast assignment information for M2M application |
| } else if {Function Index == 0b11} { | ... | |
| Burst Size | 6 | Burst size as indicated in the first 39 entries in Table 958 |
| Resource Index | 11 | 512 FFT size: 0 in first 2 MSB bits + 9 bits for resource index<br>1024 FFT size: 11 bits for resource index<br>2048 FFT size: 11 bits for resource index<br>Resource index includes location and allocation size. |
| Long_TTI_Indicator | 1 | Indicates number of AAI subframes spanned by the allocated resource.<br>0b0: 1 AAI subframe (default TTI)<br>0b1: 4 DL AAI subframe for FDD or all DL AAI subframes for TDD (long TTI) |
| Multicast transmission end indicator | 1 | Indicates whether the data indicated by this A-MAP is the last data. |
| Reserved | 15 | — |
| } | | |

Referring to Table 6, a broadcast assignment A-MAP IE can include an A-MAP IE type field indicating an A-MAP IE type and a function index field indicating a function of the broadcast assignment A-MAP IE. If the function index field indicates a multicast assignment A-MAP IE for an M2M application, an information field (e.g., a burst size field, a resource index field, a long_TTI_Indicator field, etc.) for resource allocation of multicast data, a multicast transmission end indicator (i.e., indicator indicating that a last multicast data is transmitted) field and an M2M group ID field indicating an M2M group ID can be further included.

When the multicast transmission end indicator field of the broadcast assignment A-MAP IE is set to 1 in the last multicast data transmission, if an M2M device receives a broadcast assignment A-MAP IE having the multicast transmission end (MTE) indicator field set to 1, the M2M device receives the last multicast data and then enters an idle mode or an unavailable interval directly. Compared to the former method of transmitting the multicast transmission end indicator in format of a MAC control message or an extended header, this method is advantageous in that other PFDM symbols are not buffered unnecessarily until the M2M device completes the decoding of MPDU (MAC protocol data unit) for the multicast data and the MAC control message or extended header including the multicast transmission end indicator. In particular, in this case, OFDM symbols are buffered up to the subframe including the last multicast data only. Even if the decoding of the multicast data is not completed, it is advantageous in that OFDM symbols need not to be buffered in a next subframe.

2. 2. Multicast Transmission End (MTE) Information Transmission Using a Paging Message A base station can provide an M2M device with information on a timing of ending a transmission of multicast data through a paging message.

When the base station informs the M2M device that the multicast data is transmitted through the paging message, the base station can inform the M2M device in advance that the M2M device should receive the multicast data until when. Thus, if the timing of ending the transmission of the multicast data is included in the paging message, the M2M device can perform a receiving operation until the timing designated by the base station.

Information on an end time of ending the transmission of the multicast data, which is included in the paging message, may include the specific frame (or, super frame, subframe, etc.) number or a duration information for receiving multicast data for a prescribed time. In this case, the duration information can be represented as the number of specific frames (or, super frames, subframes, etc.).

2. 2. 1. MTET (Multicast Transmission End Time) Setting

Figure 10:
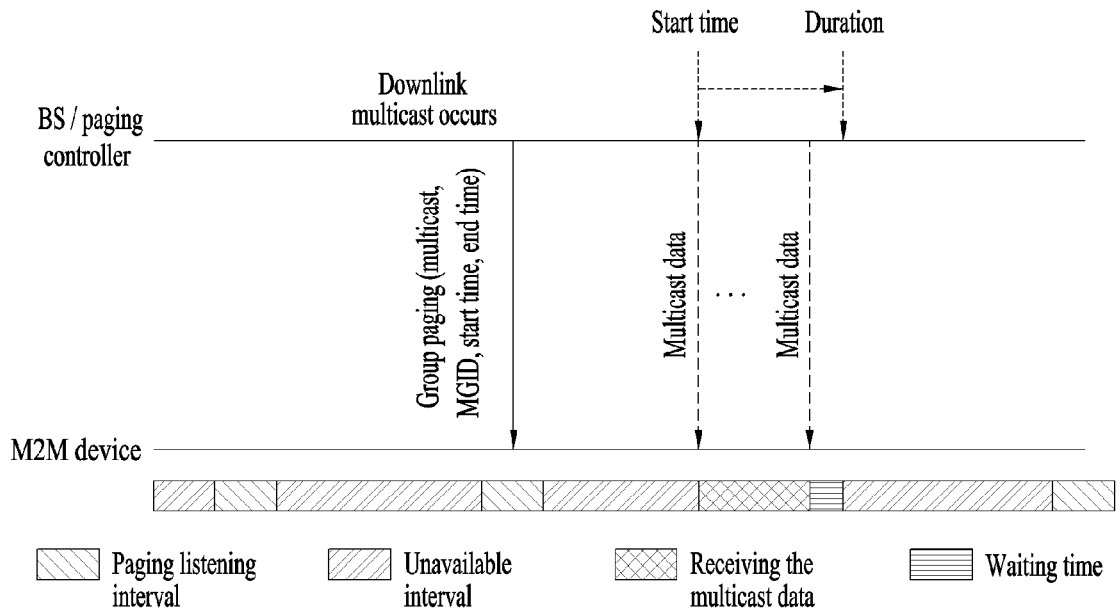

FIG. 10 is a diagram for another example of a multicast data transmission between an M2M device and a base station according to one embodiment of the present invention.

Referring to FIG. 10, an M2M device in idle mode can receive a paging message including a multicast traffic indicator indicating a multicast traffic transmission and a group information (e.g., M2M group ID) for receiving a multicast traffic (or multicast data) from a base station. In this case, the paging message sent to the M2M device by the base station may include an end time (MTET) for a multicast data transmission. If the paging message is used together with the embodiment mentioned in the foregoing description, it can include a start time (MTST) for a multicast data transmission. For clarity of the following description, assume that both a multicast data transmission start time and a multicast data transmission end time are included in a paging message in FIG. 10.

The M2M device starts to receive the multicast data based on the multicast transmission start time included in the paging message received from the base station and then ends the multicast data reception based on the multicast transmission end time. For instance, if a multicast data transmission end time information includes a frame (or, super frame, subframe, etc.) number, the M2M device receives the multicast data until a specific frame (or, super frame, subframe, etc.) included in the paging message, does not receive the multicast data in a next frame (or, super frame, subframe, etc.) and the like, and is then able to enter an unavailable interval.

Table 7 shows one example of a paging message (e.g., AAI-PAG-ADV message) format.

TABLE 7

| Field | Size (bits) | Value/Description | Condition |
|---|---|---|---|
| ... | | | |
| For (i=0; i<Num_MGID; i++) { | | Num_MGID indicate the number of MGIDs included in this paging message | |
| MGID | 15 | M2M Group ID | |
| Action code | 1 | 0: Performing the network reentry<br>1: Receiving the multicast traffic | |
| If (Action code == 1) { | | | |
| Multicast transmission start time (MTST) | 8 | Least Significant TBD bits of the frame number in which the ABS starts sending the DL multicast data. | Shall be present when the MTST need be included in this message |
| Multicast transmission end time (MTET) | 8 | Least Significant TBD bits of the frame number in which the ABS finishes sending the DL multicast data. | Shall be present when the MTST need be included in this message |
| } | | | |
| ... | ... | ... | ... |
| } | | | |

Referring to Table 7, a paging message includes an action code indicating a network reentry, a multicast or traffic reception or the like. If the action code set to 1 indicates the multicast traffic reception, the paging message can include a multicast transmission start time (MTST) field corresponding to an information on a multicast transmission start time or a multicast transmission end time (MTET) field corresponding to an information on a multicast transmission end time. For example, the MTST may indicate least significant bits (LSB) of the frame number of a frame in which 8-bit DL multicast data starts to be transmitted. For another example, the MTET may indicate least significant bits (LSB) of the frame number of a frame in which the transmission of 8-bit DL multicast data is ended.

In this case, the paging message may include the corresponding field only if the MTST or MTET field is necessary. For instance, in case of the MTET field, if a timing point of ending a multicast data transmission is identical to a timing point of ending an unavailable interval (or a timing point of starting a paging listening interval), a base station may not have the MTET field included in the paging message. Moreover, if a difference between a timing point of ending a multicast data transmission and a timing point of ending an unavailable interval (or a timing point of starting a paging listening interval) belongs to an allowable range, i.e., if the difference is equal to or smaller than a specific threshold, the MTET field may not be included in the paging message. In this case, the threshold may include the number of frames (or, super frames, subframes, etc.) for example.

2. 2. 2. Duration/Timer Setting

Figure 11:
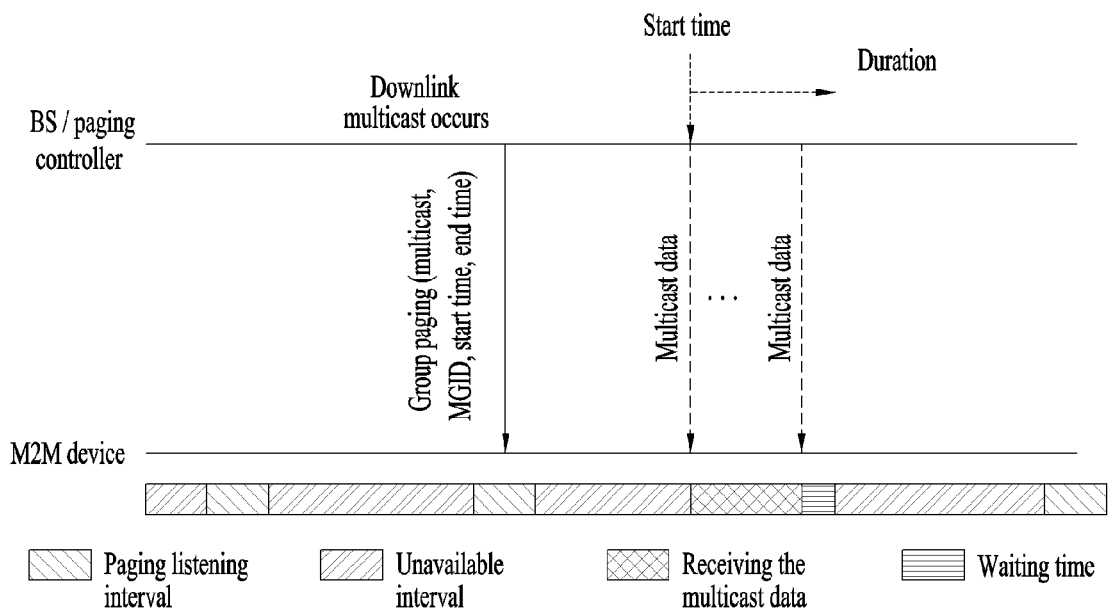

FIG. 11 is a diagram for another example of a multicast data transmission between an M2M device and a base station according to one embodiment of the present invention.

Referring to FIG. 11, an M2M device in idle mode receives a paging message including a multicast traffic indicator indicating a multicast traffic transmission and a group information (e.g., M2M group ID) for receiving a multicast traffic (or multicast data) from a base station. In this case, the paging message sent to the M2M device by the base station may include a duration or timer for the multicast data transmission. If the paging message is used together with the embodiment mentioned in the foregoing description, it can include a start time (MTST) for a multicast data transmission. For clarity of the following description, assume that both a multicast data transmission start time and a duration/timer for a multicast data transmission are included in a paging message in FIG. 11.

The M2M device starts to receive the multicast data based on the multicast transmission start time (MTST) included in the paging message received from the base station. Based on the multicast data transmission duration, if the corresponding duration or timer expires, the M2M device ends the multicast data reception. For instance, if the duration of the multicast data transmission includes a frame (or, super frame, subframe, etc.) number, the M2M device receives the multicast data until a duration expiring frame (or, super frame, subframe, etc.), does not receive the multicast data in a next frame and the like, and is then able to enter an unavailable interval. In doing so, if the MTST field is included in the paging message, the duration or timer of the multicast data transmission starts from a timing point indicated by the MTST. If the MTST field is not included in the paging message, the duration or timer of the multicast data transmission may start from a timing point of receiving the paging message.

Table 8 shows one example of a paging message (e.g., AAI-PAG-ADV message) format.

TABLE 8

| Field | Size (bits) | Value/Description | Condition |
|---|---|---|---|
| ... | | | |
| For (i = 0; I < Num_MGID; i++) { | | Num_MGID indicates the number of MGIDs included in this paging message | |
| MGID | 15 | M2M Group ID | |
| Action code | 1 | 0: Performing the network reentry 1: Receiving the multicast traffic | |
| If (Action code == 1) { | | | |
| Multicast transmission start time (MTST) | 8 | Last Significant TBD bits of the frame number in which the ABS starts sending the DL multicast data | Shall be present when the MTST need be included in this message |
| Duration | 8 | This filed indicates how long a mobile station performs an operation of receiving multicast data. After the corresponding duration, the mobile station can enter an unavailable interval. | |
| } | | | |
| ... | ... | ... | ... |
| } | | | |

In Table 8, although a duration field is exemplarily shown, a timer field indicating the same information may be included instead of the corresponding field.

Referring to Table 8, a paging message includes an action code indicating a network reentry, a multicast or traffic reception or the like. If the action code set to 1 indicates a multicast traffic reception, the paging message can include a multicast transmission start time (MTST) field corresponding to an information on a multicast transmission start time or a duration field corresponding to an information on a multicast transmission end time. For example, the duration field may have 8-bit size.

In this case, the paging message may include the corresponding field only if the MTST or duration field is necessary. For instance, in case of the duration field, if a timing point of ending a multicast data transmission is identical to a timing point of ending an unavailable interval (or a timing point of starting a paging listening interval), a base station may not have the duration field included in the paging message. Moreover, if a difference between a timing point of ending a multicast data transmission and a timing point of ending an unavailable interval (or a timing point of starting a paging listening interval) belongs to an allowable range, i.e., if the difference is equal to or smaller than a specific threshold, the duration field may not be included in the paging message. In this case, the threshold may include the number of frames (or, super frames, subframes, etc.) for example.

Moreover, the base station may be able to count the timer information included in the paging message by starting after a transmission of the multicast. After a last multicast data has been transmitted, if multicast data is not received for a predetermined time, an M2M device does not receive the multicast data and is able to enter an unavailable interval. For instance, in case that the timer of the multicast data transmission includes the frame (or, super frame, subframe, etc.) number, the M2M device keep receiving multicast data until a timer expiring frame (or, super frame, subframe, etc.) after receiving the last multicast data. If failing to receive multicast data until the expiration of the timer, the M2M device does not receive multicast data in a next frame and the like and is able to enter an unavailable interval.

Table 9 shows one example of a paging message (e.g., AAI-PAG-ADV message) format.

TABLE 9

| Field | Size (bits) | Value/Description | Condition |
|---|---|---|---|
| ... | | ... | |
| For (i = 0; I < Num_MGID; i++) { | | Num_MGID indicates the number of MGIDs included in this paging message | |

TABLE 9-continued

| Field | Size (bits) | Value/Description | Condition |
|---|---|---|---|
| MGID | 15 | M2M Group ID | |
| Action code | 1 | 0: Performing the network reentry<br>1: Receiving the multicast traffic | |
| If (Action code == 1) { | | | |
| Multicast transmission start time (MTST) | 8 | Last Significant TBD bits of the frame number in which the ABS starts sending the DL multicast data | Shall be present when the MTST need be included in this message |
| End timer(T_x) | 8 | After a mobile statin has received data, if the mobile station does not receive data until expiration of a corresponding timer, the mobile station can enter an unavailable interval. | |
| } | | | |
| ... | ... | ... | ... |
| } | | | |

Referring to Table 9, a paging message includes an action code indicating a network reentry, a multicast or traffic reception or the like. If the action code set to 1 indicates a multicast traffic reception, the paging message can include a multicast transmission start time (MTST) field corresponding to an information on a multicast transmission start time or a timer field corresponding to an information on a multicast transmission end time. For example, the timer field may have 8-bit size. In this case, the paging message may include the corresponding field only if the MTST or timer field is necessary. This is as good as described with reference to Table 8 and its details shall be omitted from the following description.

2. 2. 3. Multicast Receiving Mode Setting

When a base station receives multicast data from a network, the received multicast data may include a traffic persistently generated with a predetermined cycle like a real-time traffic or a small-sized traffic generated in a specific time like an application update or a software update. A small-sized multicast data generated on the basis of an event is transmitted to an M2M device in a short time, whereas a data persistently generated like a real-time traffic is periodically transmitted to an M2M device in a long time. Hence, when a base station intends to transmit multicast data to an M2M device in idle mode after multicast paging, the base station can set up whether the M2M device keeps performing an operation of receiving the multicast data until a next paging listening interval. For example of the setting method, the aforementioned multicast transmission end time (MTET) or an indication information indicating whether to use a duration/timer for the multicast data transmission can be transmitted to the M2M device in a manner of being contained in a paging message.

Table 10 shows one example of a paging message (e.g., AAI-PAG-ADV message) format.

TABLE 10

| Field | Size (bits) | Value/Description | Condition |
|---|---|---|---|
| ... | | | |
| For (i = 0; I < Num_MGID; i++) | | Num_MGID indicates the number of MGIDs included in this paging message | |
| { | | | |
| MGID | 15 | M2M Group ID | |
| Action code | 1 | 0: Performing the network reentry<br>1: Receiving the multicast traffic | |
| If (Action code == 1) { | | | |
| Multicast receiving mode | 1 | 1: Mobile station performs an operation of receiving multicast data until a next paging listening interval start. | |
| Multicast transmission start time (MTST) | 8 | Last Significant TBD bits of the frame number in which the ABS starts sending the DL multicast data | Shall be present when the MTST need be included in this message |
| End timer(T_x) | 8 | After a mobile statin has received data, if the mobile station does not receive data until expiration of a corresponding timer, the mobile station can enter an unavailable interval. | Included when a multicast receiving mode is set to 0. |
| } | | | |
| ... | ... | ... | ... |
| } | | | |

In Table 10, although an end timer (T_x) field is exemplarily shown, the MTET field mentioned in the description of (2. 2. 1.) or the duration field mentioned in the description of (2. 2. 2.) may be included instead of the corresponding field.

Referring to Table 10, a paging message includes an action code indicating a network reentry, a multicast or traffic reception or the like. If the action code set to 1 indicates a multicast traffic reception, the paging message can include a multicast receiving mode field or a multicast transmission start time (MTST) field corresponding to an information on a multicast transmission start time.

The multicast receiving mode field has 1-bit size. If the corresponding field indicates 0, a filed (e.g., MTET, duration, timer, etc.) indicating the aforementioned information on the multicast transmission end time can be included. On the contrary, if the corresponding field indicates 1, the field indicating the information on the multicast transmission end time is not included.

In particular, in case of attempting to transmit a multicast data periodically transmitted like a real-time traffic, a base station sets a multicast receiving mode field to 1. If the multicast receiving mode field indicates 1, an M2M device waits for receiving multicast data until a timing point of starting a next paging listening interval (or a timing point of ending an unavailable interval). In doing so, the base station may not transmit the multicast end indication (e.g., MTEEH, AAI-MTE-END message, MTEH, multicast transmission end indication A-MAP IE, broadcast assignment A-MAP IE, etc.) mentioned in the foregoing description of (2. 1.) prior to a next paging listening interval start.

On the contrary, if the multicast receiving mode field is set to 0, the paging message may include a field (e.g., MTET, duration, timer, etc.) indicating the aforementioned information on the multicast transmission end time. Based on the corresponding field, an M2M device performs an operation of receiving multicast data until the transmission end time. After the end timing point, the M2M device enters an unavailable interval.

Moreover, irrespective of a value of the multicast receiving mode field, as mentioned in the foregoing description of (2. 1.), as a base station transmits a multicast end indication, while a mobile station performs an operation of receiving multicast data, if the mobile station receives the multicast end indication before a start of a next paging listening interval, the mobile station stops the operation of receiving the multicast data and is able to enter a paging listening interval.

So far, various embodiments relating to multicast data transmissions between an M2M device and a base station are described, which are not limited to multicast data. And, the same technical idea can apply to unicast data, broadcast data and the like.

3. The General of Device to which Present Invention is Applicable

Figure 12:
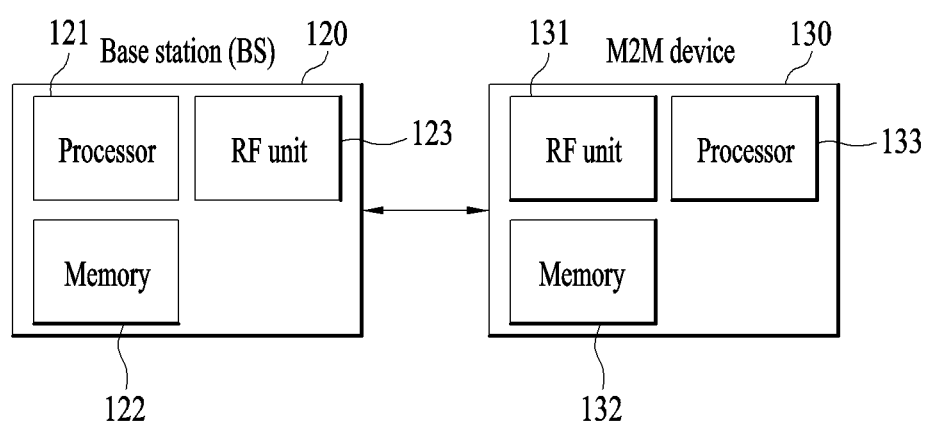
FIG. 12 is a block diagram for a configuration of a wireless communication device according to one embodiment of the present invention.

FIG. 12 is a block diagram for a configuration of a wireless communication device according to one embodiment of the present invention.

Referring to FIG. 12, a wireless communication system includes a base station 120 and a plurality of M2M devices 130 located in an area of the base station 120. Although FIG. 12 shows one example that communication is performed between the base station 120 and the M2M device 130, an M2M communication method according to the present invention may be performed between M2M devices. And, the respective devices can performs the methods according to the various embodiments mentioned in the foregoing description in the same configuration of the devices shown in FIG. 12.

The base station 120 includes a processor 121, a memory 122 and an RF (radio frequency) unit 123. The processor 121 implements the functions, processes and/or methods proposed by the present invention. Layers of a radio interface protocol can be implemented by the processor 121. The memory 122 is connected to the processor 121 and stores various kinds of informations for driving the processor 121. The RF unit 123 is connected to the processor 121 and then transmits and/or receives radio signals.

The M2M device 130 includes a processor 131, a memory 132 and an RF (radio frequency) unit 133. The processor 131 implements the functions, processes and/or methods proposed by the present invention. Layers of a radio interface protocol can be implemented by the processor 131. The memory 132 is connected to the processor 131 and stores various kinds of informations for driving the processor 131. The RF unit 133 is connected to the processor 131 and then transmits and/or receives radio signals.

The memory 122/132 may be included inside or outside the processor 121/131 and then connected to the processor 121/131 via a means known well to the public. Optionally, the base station 120 and/or the M2M device 130 may have a single antenna or multiple antennas.

Meanwhile, the M2M device 130 can include various additional configurations (not shown in the drawing) depending on an application type of the device. If the M2M device 130 is provided for intelligent metering, the corresponding M2M device 130 may include additional configurations for power measurements and the like. Such a power measuring operation may be controlled by the processor 131 shown in FIG. 12 or a separately configured processor (not shown in the drawing).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of transmitting multicast data in a wireless communication according to the present invention is mainly described with reference to the examples applying to IEEE 802 system and may be applicable to various wireless communication systems as well as to the IEEE 802 system.

What is claimed is:

1. A method of receiving multicast data in a wireless communication system supportive of M2M (machine to machine) communication, comprising:
   receiving a paging message including information on a timing point of ending a transmission of the multicast data from a base station in a paging listening interval;
   receiving the multicast data from the base station; and
   entering an unavailable interval if the timing point of ending the transmission of the multicast data comes,
   wherein the paging message includes a multicast transmission end time (MTET) field and wherein the information on the timing point of ending the transmission of the multicast data comprises a frame number for ending the transmission of the multicast data indicated by the MTET field.

2. The method of claim 1, wherein the paging message includes a duration field and wherein the information on the timing point of ending the transmission of the multicast data comprises an interval ranging from a timing point of receiving the paging message indicated by the duration field to the timing point of ending the transmission of the multicast data.

3. The method of claim 2, wherein if the paging message includes a multicast transmission start time (MTST) field, the duration filed indicates an interval ranging from a timing point indicated by the MTST field to the timing point of ending the transmission of the multicast data.

4. The method of claim 1, wherein the paging message includes a timer field and wherein the information on the timing point of ending the transmission of the multicast data comprises an interval ranging from a timing point of a last reception of the multicast data indicated by the timer field to the timing point of ending the transmission of the multicast data.

5. The method of claim 1, wherein the paging message further includes a multicast receiving mode field and wherein if the multicast receiving mode field is set to a predetermined value, the paging message includes the information on the multicast transmission end time.

6. The method of claim 1, wherein the paging message comprises an AAI-PAG-ADV message.

7. An apparatus for receiving multicast data in a wireless communication system supportive of M2M (machine to machine) communication, comprising:
 an RF (radio frequency) unit configured to transceive a radio signal; and
 a processor receiving a paging message including information on a timing point of ending a transmission of the multicast data from a base station in a paging listening interval, the processor receiving the multicast data from the base station, the processor entering an unavailable interval if the timing point of ending the transmission of the multicast data comes,
 wherein the paging message includes a multicast transmission end time (MTET) field and wherein the information on the timing point of ending the transmission of the multicast data comprises a frame number for ending the transmission of the multicast data indicated by the MTET field.

8. The apparatus of claim 7, wherein the paging message includes a duration field and wherein the information on the timing point of ending the transmission of the multicast data comprises an interval ranging from a timing point of receiving the paging message indicated by the duration field to the timing point of ending the transmission of the multicast data.

9. The apparatus of claim 8, wherein if the paging message includes a multicast transmission start time (MTST) field, the duration filed indicates an interval ranging from a timing point indicated by the MTST field to the timing point of ending the transmission of the multicast data.

10. The apparatus of claim 7, wherein the paging message includes a timer field and wherein the information on the timing point of ending the transmission of the multicast data comprises an interval ranging from a timing point of a last reception of the multicast data indicated by the timer field to the timing point of ending the transmission of the multicast data.

11. The apparatus of claim 7, wherein the paging message further includes a multicast receiving mode field and wherein if the multicast receiving mode field is set to a predetermined value, the paging message includes the information on the multicast transmission end time.

12. The apparatus of claim 7, wherein the paging message comprises an AAI-PAG-ADV message.

\* \* \* \* \*